United States Patent [19]

Buschmann et al.

[11] Patent Number: 4,710,480

[45] Date of Patent: Dec. 1, 1987

[54] METHOD OF CERAMIC MOLDING WHICH PRODUCES A POROSITY GRADIENT AND THE MANUFACTURE OF COMPOUND MOLDINGS USING THIS METHOD

[75] Inventors: Rüdiger Buschmann, Amberg; Rudolf Ganz, Mainz-Gonsenheim; Gerd Willmann, Neidernhausen; Ludwig Wirth; Ingo Elstner, both of Wiesbaden; Peter Jeschke, Walluf, all of Fed. Rep. of Germany

[73] Assignee: Didier-Werke AG, Wiesbaden, Fed. Rep. of Germany

[21] Appl. No.: 804,280

[22] Filed: Dec. 3, 1985

[30] Foreign Application Priority Data

Dec. 5, 1984 [DE] Fed. Rep. of Germany ....... 3444407

[51] Int. Cl.$^4$ .................... C04B 35/02; C04B 35/80
[52] U.S. Cl. ........................... 501/95; 501/88; 501/89; 501/90; 501/153; 501/154; 264/69; 264/70; 264/71; 264/DIG. 19
[58] Field of Search .................. 501/32, 39, 80–84, 501/88, 89, 90, 95, 153, 154; 264/69, 70, 71

[56] References Cited

U.S. PATENT DOCUMENTS

| | | | |
|---|---|---|---|
| 2,897,572 | 8/1959 | Hansen | 264/71 |
| 3,060,543 | 10/1962 | Shaw | 264/71 |
| 3,103,722 | 9/1963 | Whitehurst et al. | 264/DIG. 19 |
| 3,371,135 | 2/1968 | Goodwin | 264/71 |
| 3,468,997 | 9/1969 | Dickels | 164/58.1 |
| 3,585,094 | 6/1971 | Ruggler | 264/71 |
| 3,754,059 | 8/1973 | Prandtl et al. | 264/69 |
| 3,989,795 | 11/1976 | McGee | 264/334 |
| 3,993,495 | 11/1976 | Galliath et al. | 106/40 |
| 4,296,065 | 10/1981 | Ishii et al. | 264/325 |
| 4,514,346 | 4/1985 | Luhleich et al. | 264/29.5 |

FOREIGN PATENT DOCUMENTS

| | | |
|---|---|---|
| 1912467 | 3/1969 | Fed. Rep. of Germany ........ 264/69 |
| 0096585 | 5/1985 | Japan ........................ 501/81 |
| 1567328 | 5/1980 | United Kingdom . |
| 2088761 | 6/1982 | United Kingdom . |
| 2104837 | 3/1983 | United Kingdom . |

*Primary Examiner*—William R. Dixon, Jr.
*Assistant Examiner*—Andrew B. Griffis
*Attorney, Agent, or Firm*—Nils H. Ljungman

[57] ABSTRACT

The invention relates to a ceramic molding which is manufactured from high-temperature resistant, fire-resistant or refractory fibers and fine-grain, fire-resistant or refractory materials and, in certain cases, from other customary additives. The ceramic molding is characterized by the fact that its porosity gradually and continuously increases along an axis of the molding from less than 20% to more than 70%. The areas with low porosity comprise the fine-grain, fire-resistant or refractory materials. The areas of high porosity comprise ceramic fiber, such as, fibers of $Al_2O_3$, $SiO_2$, $ZrO_2$, C, SiC or mixtures thereof. The intermediate areas are constructed of mixtures of ceramic fiber and fire-resistant or refractory materials. The invention also relates to the use of such a ceramic molding method for the manufacture of compound moldings saturated or infiltrated with organic resins, pitch, tar, metals, metal alloys or glasses.

15 Claims, No Drawings

METHOD OF CERAMIC MOLDING WHICH PRODUCES A POROSITY GRADIENT AND THE MANUFACTURE OF COMPOUND MOLDINGS USING THIS METHOD

BACKGROUND OF THE INVENTION

1. Field of the Invention

The invention relates to a ceramic molding which is manufactured from high-temperature resistant, fire-resistant or refractory fibers and fine-grain, fire-resistant or refractory materials, and from other customary additives.

2. Description of the Prior Art

It is known to produce ceramic moldings which are manufactured from high-temperature resistant, fire-resistant or refractory fibers and materials. However, it is customary that the fire-resistant or refractory fibers have a distribution which is as homogeneous as possible over the cross section of the ceramic molding. For example, U.S. Pat. No. 4,514,346 to Luhleich, et al. teaches a method for making thermal-shock resistant molded articles with silicon carbide. The articles made according to this process are homogeneous and throughgoingly porous molded articles or parts. Another such example can be found in U.S. Pat. No. 3,993,495 to Galliath, et al., which patent teaches a porous ceramic article having a uniform open porosity of at least 20% by volume with average pore size in the range of 1-10 microns. Finally, it has also been a customary practice in the art to work toward a method of producing highly densified ceramic articles in which the ceramic articles so produced have a density substantially equal to the theoretical density through uniform porosity. Both above-mentioned U.S. Pat. Nos. 4,514,346 and 3,993,495, are incorporated herein by reference.

OBJECTS OF THE INVENTION

It is, therefore, an object of the present invention to provide a ceramic molding with special refractory properties, whereby this ceramic molding is specifically intended for use as a reinforcement body. It is another object of this invention to provide a ceramic body so that a progressive and steady change of the composition of the suspension within that body is achieved with regard to high-temperature resistant, fire-resistant or refractory compounds on the one hand and fine-grain, fire-resistant or refractory materials on the other hand. It is yet another object of this invention to provide a method of manufacturing a ceramic molding which is suitable for use in the manufacture of pistons for internal combustion engines identified by their content of aluminum alloys.

SUMMARY OF THE INVENTION

The invention provides a ceramic molding manufactured from high-temperature resistant, refractory or fire-resistant fibers, and fine-grain, fire-resistant or refractory materials and in certain cases, other customary additives. The ceramic molding of this invention is characterized by the fact that its porosity gradually and continuously increases along an axis of the molding from less than 20% to more than 70%, so that predetermined areas of the molding possess distinct degrees of porosity. The areas with low porosity comprise, and preferably consist of, basically fine-grain, fire-resistant or refractory materials. The areas of high porosity comprise, and preferably consist of, basically ceramic fiber, such as fibers of $Al_2O_3$, $SiO_2$, $ZrO_2$, C, SiC, or mixtures thereof. The intermediate areas are constructed of mixtures of the ceramic fiber and the fire-resistant or refractory materials.

DESCRIPTION OF THE PREFERRED EMBODIMENTS

According to a preferred embodiment, the areas with low porosity are made of materials comprising more than 90 percent by weight $SiO_2$, and the areas with high porosity of materials comprising less than 60 percent by weight $SiO_2$.

According to another preferred embodiment, the areas with low porosity are made of materials which comprise more than 90 percent by weight $ZrO_2$, and the areas with high porosity of materials which comprise less than 60 percent by weight $ZrO_2$.

According to another preferred embodiment, the areas with low porosity are made of materials comprising more than 90 percent by weight $Al_2O$, and the areas with high porosity are made of materials comprising less than 60 percent by weight $Al_2O_3$ According to another preferred embodiment, the areas with low porosity are made of materials with more than 80 percent by weight of glass phase, and the areas with high porosity are made of materials with more than 80 percent by weight of crystalline phase.

The invention also refers to the use of such a ceramic molding for the production of compound moldings saturated or infiltrated with organic resins, pitch, tar, metals, metal alloys or glasses, specifically of pistons infiltrated with aluminum alloys for internal combustion engines.

Such a ceramic molding, according to the invention, can be manufactured by manufacturing individual mixtures of high-temperature resistant, fire-resistant or refractory fibers and fine-grain, fire-resistant or refractory materials in differing ratios, as well as any customary additives, specifically aqueous dispersions or suspensions, and casting these mixtures with the different ratios of fibers to refractory materials one after another into a mold which makes possible the suction of the dispersant or suspension agent, specifically water.

The fire-resistant or refractory fibers used for the manufacture of the ceramic molding are fibers which are known to the specialist, called mineral fibers. Examples of such fibers are aluminum silicate fibers, aluminum oxide fibers, quartz fibers, carbon fibers, SiC fibers or fibers containing $ZrO_2$. Of course, mixtures of different fibers can also be used. High-temperature resistant fibers include aramid fibers, that is, organic fibers which can withstand temperatures of up to 600° C., at least for short periods of time.

In the manufacture of the ceramic moldings, according to the invention, the customary materials known to the specialist can be used as fine-grain, fire-resistant or refractory materials, for example, materials based on $Al_2O_3$ such as corundum, sintered bauxite, tabular alumina, etc.; aluminum silicate; materials such as cordierite, sillimanite, mullite, etc.; and $SiO_2$ materials such as quartz, $ZrO_2$, SiC, $Cr_2O_3$ or mixtures thereof. At least some of these materials can be used in colloidal form.

Examples of customary additives, which can be added when appropriate, include surface-active materials, densifiers such as starches, and flocculants such as organic polymers, for example, polyacrylate dispersions.

The grain size of fine-grain, fire-resistant or refractory materials is advantageously less than 0.09 mm, so that a good dispersion of the mixture of fibers and fine-grain material is assured.

In the manufacture of the ceramic moldings, it is also possible, at the beginning and the end of the manufacturing process, to use a dispersion, which contains only high-temperature resistant, fire-resistant or refractory fibers and any additives, or only fine-grain, fire-resistant or refractory materials and any additives, so that in the manufacture of the ceramic moldings, on the one side of the molding only fibers are present, and on the other side only fine-grain, fire-resistant or refractory materials, whereby a particularly high porosity gradient is achieved.

In the manufacture of the ceramic moldings, the dispersions or suspensions of the high-temperature resistant, fire-resistant or refractory fibers on the one hand and/or of the fine-grain, fire-resistant or refractory materials are generally added with water. It is also possible, however, to use organic solvents for this purpose.

When pouring the various mixtures into a mold which allows the suction of the dispersion liquid or suspension liquid, care must be taken to avoid the layers from mixing with one another in an uncontrolled manner, that is, from flowing together. This can be achieved by suitable measures, for example, a slow pouring, or with the use of a rough screen, which is introduced into the casting mold and which allows a careful pouring on top of the dispersion or suspension which has just been poured in, whereby the layer already poured in largely retains its position. After the pouring of the layer in question, the screen can be lifted, to pour in the next layer of a dispersion or suspension with another composition. Of course, the screen must be removed carefully, so that any intermixing of the individual layers is avoided as much as possible.

After all the layers have been poured into the mold, a vibration is advantageously applied to the layers present in the mold, until the layers at the boundary surfaces have mixed uniformly with one another, so that a progressive and steady change of the composition of the suspension is achieved with regard to high-temperature resistant, fire-resistant or refractory compounds on the one hand and fine-grain, fire-resistant or refractory materials on the other hand.

Then the individual layers mixed uniformly with one another at their boundaries, can be allowed to stand for up to 100 hours in the mold. Normally, however, a setting time of less than 2 hours is all that is necessary. The mold can be a porous mold, for example, made of gypsum, which absorbs the dispersion liquid or suspension liquid into itself. The raw molding is then unmolded and generally dried at temperatures between 80° C. and 150° C. for 2 to 48 hours. After the drying, the casting is fired at an appropriate temperature, whereby this temperature is a function of the limit application temperature of the fibers used and the sintering or melting temperatures of the fine-grain, fire-resistant or refractory materials. During this firing, a reaction takes place between the fine-grain, fire-resistant or refractory materials and/or the high-temperature resistant, fire-resistant or refractory fibers, depending on which component is present in which layer. In this manner, by reaction of the high-temperature resistant, fire-resistant or refractory fibers, a so-called fiber ceramic is formed, which means that fibers are formed into a matrix by sintering or chemical reaction, that is, they adhere to one another at their contact surfaces, whereby the fiber ceramic of the present invention comprises 90–100% fibers and the remainder organic binders, that is, up to 10 percent by weight binder.

As a result of the manufacturing method described above for the ceramic moldings, the porosity is different in one spatial direction of the molding, namely, perpendicular to the layers introduced into the mold, whereby the porosity in the direction of the layers which consist of dispersions or suspensions with only or predominantly fine-grain, fire-resistant or refractory materials, increases progressively and steadily toward the layers of dispersions or suspensions of only or predominantly fire-resistant or refractory fibers.

As a result of the composition of the dispersions or suspensions of mixtures of fibers and fine-grain materials used for the manufacture of the ceramic moldings, it is possible that on one side of the molding there is a porosity of less than 20%, while on the opposite side, the porosity can exceed 70%.

In the manufacture of the ceramic moldings, it is also possible to use inorganic or organic binders as the possible additives, whereby so-called chemical binders, for example, phosphate, can be used, that is, binders which bring about a chemical reaction between the individual components when the molding is fired.

The moldings, according to the invention, are particularly suited for the manufacture of saturated or infiltrated compound material moldings. As a result of the different porosity of the molding in one direction, the extent of the saturation or infiltration with the materials in question, such as organic resins, metals, metal alloys or glasses differs, so that a ceramic molding is obtained which exhibits a gradient-like saturation or infiltration portion which essentially runs parallel to this porosity. Instead of organic resins, pitch or tar can also be used. After cracking at high temperatures, for example, 400° C. to 600° C., so-called carbon-infiltrated moldings are obtained. The use of the ceramic moldings according to the invention is particularly preferred for the manufacture of pistons for internal combustion engines, since on account of the different proportion of the infiltrated aluminum alloy on the one side of the piston, a surface is obtained which predominantly contains the aluminum alloy, while on the opposite side, the amount of infiltrated aluminum alloy, in relation to a unit of volume of the ceramic molding, is very much lower. In this manner, it is possible that a piston for internal combustion engines manufactured and infiltrated, as described above, will have on one side more of the properties of the aluminum alloy, that is, a high heat conductivity and strength, while on the other side of the piston, there will be a much lower heat conductivity with even higher mechanical strength. The advantage of such pistons, whose physical parameters, specifically the heat conductivity, change according to a gradient over their cross section, exhibits the advantage of increasing the combustion chamber temperature and decreasing the work required to cool the pistons. The impregnation of porous ceramic moldings with metals or alloys is described in British Pat. No. 1 567 328, and also in British patent application No. GB 2 088 761 A. The aforedescribed references are incorporated herein by reference as if fully set forth.

The manufacture of a ceramic molding is described in greater detail by the following example:

First of all, various mixtures of refractory fibers were produced with a limit application temperature of 1260° C. (aluminum silicate fibers) and of $SiO_2$ slip in water, whereby the slip contains 50 percent by weight solids, in the following ratios. To achieve a certain green strength of the cast and unmolded molding, 5% starches were added to the slip, in relation to the dry materials used.

|  | Fibers (percent by weight) | $SiO_2$ slip (percent by weight) |
| --- | --- | --- |
| Mixture 2: | 94 | 6 |
| Mixture 3: | 86 | 14 |
| Mixture 4: | 64 | 36 |
| Mixture 5: | 49 | 51 |

A Mixture 1 was also produced which comprised, and preferably consisted of, a suspension of 10% of the fibers in water. Another Mixture 6 included only the above-mentioned $SiO_2$ slip.

These mixtures 1 to 6 were poured one after another into a porous gypsum mold. Then Mixture 1 was added, which contained only the fibers. Then, using a rough-mesh screen which prevented the individual layers from mixing with one another during the pouring, Mixtures 2 to 5 were poured in one after another. Then a layer of the pure $SiO_2$ slip of Mixture 6 was poured in, so that the molding was made of a total of six layers. The theoretical composition of the layers, apart from a minor amount of mixing at the boundary surfaces during the pouring, was as follows:

|  | Fibers (percent by weight) | $SiO_2$ slip (percent by weight) |
| --- | --- | --- |
| Layer I | 100 | 0 |
| Layer II | 94 | 6 |
| Layer III | 86 | 14 |
| Layer IV | 64 | 36 |
| Layer V | 49 | 51 |
| Layer VI | 0 | 100 |

The mold filled with the layers was vibrated for 5 minutes on a vibration table until the layers had mixed uniformly with one another at the boundary surfaces. During preliminary tests in a transparent glass mold, it was determined that such a fiveminute vibration is sufficient.

After setting for 10 hours at room temperature, the raw molding was removed from the mold and initially dried for 10 hours at 80° C. and then for another 12 hours at 110° C. After drying, the molding, now completely free of water, was fired for 4 hours at a temperature of 1000° C.

The heat conductivity and porosity on the one side of the molding were 1.0 W/mk at 800° C. or 15%, while on the other side of the ceramic molding, a porosity of 80% and a heat conductivity of only 0.16 W/mk at 800° C. were measured The invention as described hereinabove in the context of the preferred embodiments is not to be taken as limited to all of the provided details thereof, since modifications and variations thereof may be made without departing from the spirit and scope of the invention.

What is claimed is:

1. A ceramic molding manufactured from high-temperature resistant fire-resistant or refractory fibers; and fine-grain, fire-resistant or refractory materials; and additives chosen from a member of the group consisting of surface active materials, densifiers, flocculants, polyacrylate dispersions and combinations thereof, said molding having a porosity of less than 20%, increasing gradually and continuously along an axis of the molding up to more than 70%, wherein the areas with low porosity comprise basically the fine-grain, fire-resistant or refractory materials such that a good dispersion of the fine grain materials and refractory materials is assured, wherein the areas of high porosity comprise the addivtives and a ceramic fiber on the basis of fibers selected from the group consisting of $Al_2O_3$, $SiO_2$, $ZrO_2$, C, SiC or mixtures thereof, and wherein the intermediate areas comprise mixtures of the ceramic fiber and fire-resistant or refractory materials.

2. The ceramic molding according to claim 1 wherein the low porosity area comprises more than 90 percent by weight $SiO_2$.

3. The ceramic molding according to claim 1 wherein the high porosity area comprises less than 60 percent by weight $SiO_2$.

4. The ceramic molding according to claim 1 wherein the low porosity area comprises more than 90 percent by weight $ZrO_2$.

5. The ceramic molding according to claim 1 wherein the high porosity area comprises less than 60 percent by weight $ZrO_2$.

6. The ceramic molding according to claim 1 wherein the low porosity area comprises more than 80 percent by weight glass-phase and wherein the high porosity area comprises more than 80 percent by weight crystal-phase.

7. The ceramic molding according to claim 1 wherein the molding is saturated with organic resin, pitch, tar, metals, metal alloys or glasses.

8. A ceramic piston manufactured from high-temperature resistant, fire-resistant or refractory fibers; and fine-grain, fire-resistant or refractory materials; and additives chosen from a member of the group consisting of surface active materials, densifiers, flocculants, polyacrylate dispersions and combinations thereof for use in internal combustion engines, wherein the porosity of said piston gradually and continuously increases along an axis of the molding from less than 20% to more than 70%, wherein the areas with low porosity comprise fine-grain fire-resistant or refractory materials such that a good dispersion of the fine grain materials and refratory materials is assured, wherein the areas of high porosity comprise the additives and a ceramic fiber on the basis of fibers selected from the group consisting of $Al_2O_3$, $SiO_2$, $ZrO_2$, C, SiC or mixtures thereof, and wherein the intermediate areas comprise mixtures of the ceramic fiber and fire-resistant or refractory materials.

9. The ceramic molding according to claim 8 wherein the low porosity area comprises more than 90 percent by weight $SiO_2$.

10. The ceramic molding according to claim 8 wherein the high porosity area comprises less than 60 percent by weight $SiO_2$.

11. The ceramic molding according to claim 8 wherein the low porosity area comprises more than 90 percent by weight $ZrO_2$.

12. The ceramic molding according to claim 8 wherein the high porosity area comprises less than 60 percent by weight $ZrO_2$.

13. The ceramic molding according to claim 8 wherein the low porosity area comprises more than 80 percent by weight glass-phase and wherein the high porosity area comprise more than 80 percent by weight crystal-phase.

14. The ceramic molding according to claim 8 wherein the molding is saturated with organic resin, pitch, tar, metals, metal alloys or glasses.

15. A method of manufacturing a ceramic molding having a progressive and steady change in the composition of suspension therein wherein the porosity of the ceramic molding has a gradual and continuous increase along the axis of molding from less than 20% to more than 70%, said method comprising the steps of:

selecting a plurality of individual mixtures each having a progressive increase in the level of $SiO_2$ content;

introducing each said plurality of individual mixtures into a mold means, substantially preventing the intermixing of said individual mixtures with one another during said introduction step;

effecting the uniform mixing of the individual layers at the respective boundary surfaces through controlled vibration of the mold;

allowing the mixtures in the mold to stand in the mold for a predetermined period of time up to about 100 hours whereby the mixtures contained in the mold can be removed therefrom as a single unit;

removing the mixture from the mold for drying at a temperature between about 80 to 150° C. for a period of time between about 2 to 48 hours; and firing the dry molded material at a predetermined temperature which is a function of the limit application temperature of the fibers used and the sintering or molding temperature of the fine-grain, fire-resistant or refractory materials contained therein wherein during this firing a reaction takes place between the fine-grain, fire-resistant or refractory materials wherein a so-called fiber ceramic is forced into a matrix by sintering or chemical reaction so that the fibers adhere to one another at their contact surfaces whereby the fiber ceramic comprises 90 to 100 percent fibers and the rest organic binders.

* * * * *